Nov. 22, 1955  H. J. SMITH ET AL  2,724,164
SHAPING CLAY-WARE
Filed Feb. 28, 1950

Inventors
HAROLD J. SMITH
JOHN A. JOHNSON
ELWIN A. HAWK
By

United States Patent Office 2,724,164
Patented Nov. 22, 1955

2,724,164

SHAPING CLAY-WARE

Harold James Smith, Overseal, John Arthur Johnson, Stoke-on-Trent, England, and Elwin Adam Hawk, East Rochester, Ohio Application February 28, 1950, Serial No. 146,816

Claims priority, application Great Britain February 28, 1949

2 Claims. (Cl. 25—26)

This invention relates to the shaping of flat clay-ware on moulds by placing a lump of clay on a mould without preliminary batting of the clay, and applying a roller shaping tool to the clay to shape the piece of clay in a single operation.

A machine of the above character forms the subject of American patent application Serial No. 755,394, now abandoned, of Harold James Smith, while in American patent application Serial No. 49,094, now abandoned, of Harold James Smith and John Arthur Johnson a similar machine is embodied in which the roller shaping tool has an external contour identical to the contour of the article being shaped, and means are described for synchronising the speeds of rotation of the roller and the article being shaped.

In the shaping of flat clay-ware articles by means of a forming tool which rolls upon the surface of the clay and is of the same contour as the article to be produced, we provide according to the present invention means whereby a difference in speed between the rotating roller and the rotating clay can be created during at least part of the shaping operation.

For instance, the head in which the piece is shaped, and the roller tool which shapes it, may both rotate at the same speed for part of the shaping operation but when the piece has been almost fully shaped a difference in speeds is created between the tool and the head so that a smoothing or burnishing effect is exerted on the surface of the clay.

Referring to the accompanying drawings.

Figure 1:
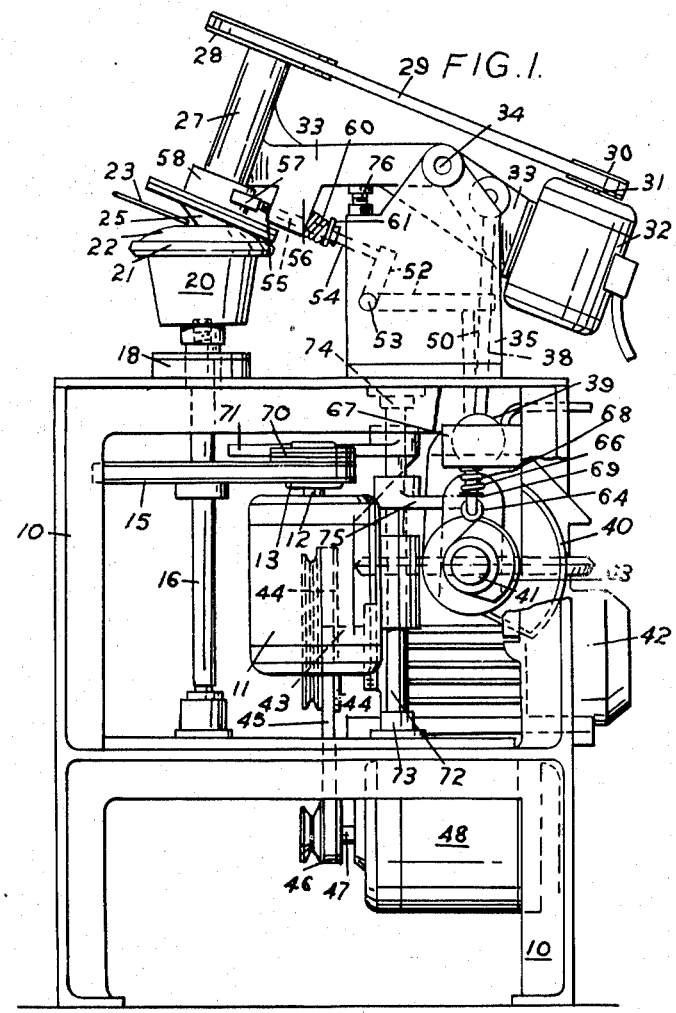
Figure 1 is a side elevation of a machine for making plates or saucers.

The machine comprises a frame or bench 10. The frame carries an electric motor 11 which drives a spindle 12 carrying a pulley 13 which by means of a V-rope 14 drives another pulley 15 mounted on a spindle 16 carried in bearings 17, 18 in the frame 10. At the top of the spindle 16 is mounted a head 20 which carries a mould 21 on which a clay plate or saucer 22 is shaped by the action of a roller tool 25. The trimming of the rim of the plate or saucer is effected by the usual scraper 23 which may be operated mechanically or by hand as is already known. The shape of the roller tool 25 corresponds with the shape of the piece 22, that is to say, the diameter of the roller where it engages with the periphery of the piece is the same as the diameter of the piece, and the roller progressively diminishes in diameter with the diameter of the piece until in the centre of the piece the roller terminates in a point. In other words, the area of the working face of the roller is equal or substantially equal to the area of the piece. The roller is mounted on a spindle (not seen) carried in a housing 27 and driven by means of a pulley 28 by a V-rope 29 from another pulley 30 mounted on the spindle 31 of another electric motor 32 carried by an arm 33 pivotally mounted at 34 in a bracket structure 35 upstanding from the frame 10. The arm 33 extends forwardly and the roller unit 25, 27 is carried by the other end of it. Therefore the roller 25 and its driving motor 32 are pivoted for movement about the horizontal axis about the pivot 34. The arm 33 has connected to it a link 38 and the other end of the link carries a roller 39 which rides on a cam 40 mounted on a shaft 41 driven from a gearbox 42. The gearbox is driven by a spindle 43 carrying a pulley 44 driven by a V-rope 45 from another pulley 46 mounted on the spindle 47 of a third electric motor 48. On the cam shaft 41 another cam is mounted which is not seen in the drawings but which operates a link 50 connected to a bell crank 52 pivoted at 53 in the bracket 35 which acts upon an adjustable tappet 54 bearing against the end of a rod 55 working in a guide 56 on the arm 33. The rod 55 carries a brake member 57 engaging with a brake boss 58 on the housing 27 for the roller. The brake is normally held off by a spring 60 bearing against the guide 56 and a fixed collar 61 on the rod 55. When the cam operates the bell-crank 52, however, the tappet 54 acts on the rod 55 and the brake is applied. Before this takes place, however, another cam 63 on the shaft 41 acts on a roller 64 and actuating rod 66 to switch off the current to the motor 32 which drives the roller 25, by means of a cut-off switch 67. After a prescribed interval the cam 63 allows the rod 66 to return under the action of a spring 68 bearing against a roller 69 on the rod, and the current is thereby switched on again by the switch 67. Before this happens, however, the brake cam has allowed the brake 57 to be disengaged from the roller. It will be preferable for the drive to the spindle 16 which carries the mould supporting head 20 to be brought to rest between successive shaping operations, and various methods exist for doing this, but a convenient way as shown in the drawings is in the form of the pulley 13. The pulley 13 includes complemental sections 13A and 13B loosely supported on the spindle and the outer face of the section 13A is adapted to engage a friction disk 70 fixedly supported by the spindle. In order to tighten the belt 14, this is accomplished by slightly slewing motor 11 and its spindle 12 and to effect this result, it will be noted that a lever 71 is fixed on a shaft 72 supported in bearings 73, 74 in the frame. The lever 71 is actuated by another lever 75 fixed on the shaft 72 and which extends in the opposite direction. The free end of the lever 75 is disposed in the path of movement of a lobe or cam surface provided on the flat face of a part carried by the shaft 41. Consequently, when the lobe moves the lever 75 downwardly to turn the shaft 72, the lever 71 will engage the disk 70 and thus slew the motor and tighten the belt and cause the pulley section to engage the friction disk 70. The limit position of the roller 25 as it is lowered into contact with the clay is governed by an adjustable set screw 76 screwed into the bracket 35, the arm 33 coming into contact with the set screw.

It will be obvious that the phase of the shaping operation at which the braking action comes into use will be governed by the brake cam. In the arrangement illustrated the driving mechanisms are arranged so that the roller 25 will rotate at the same speed as the head 22 until the shaping operation is practically complete. Thus there will be as nearly as possible uniform velocity of the areas of the roller and clay which are in contact, because the diameter of the roller corresponds with the diameter of the clay piece as nearly as possible at all points. When the piece is almost fully shaped the brake 57 will act to retard the roller 25, or may even stop it, to finish off and smooth the surface of the clay piece. Obviously this arrangement can be modified should the characteristics of the clay body, or the shape of the piece, or any other factor make it desirable. For instance the braking components 57, 58 could easily be applied to the spindle 16 or head 20 to control the rotation of the mould 21, either as well as or instead of the arrangement shown. A similar effect could be obtained by accelerating one of the components in relation to the other. It might even be desired to reverse the rotation of one of the components. A further possibility is that the components might be rotating at a different speed throughout the shaping operation. Instead of positively driving both the roller tool 25 and the head 20 it may be found preferable in some cases to leave one of them, preferably the roller, freely revolvable, so that it will rotate by contact with the other member instead of positively. The angle of the axis of rotation of the roller, the horizontal positioning of the roller upon the face of the work, and the vertical setting of the roller governing the thickness of the piece of ware, are all adjustable in the housing 27 to facilitate changing rollers on the machine to different shapes and sizes of ware. During the shaping operation the clay, or the roller, or both, may be sprayed or coated with oil or other liquid.

A further modification is to cause the shaping tool 25 to roll bodily round the mould 21 about the axis of the mould. This movement is also subject to the flexibility of control described in connection with the rotation of the individual members 21, 25 about their own axes. It may be effected instead of or in addition to creating rotation of the tool 25 about its own axis. It is desirable that where the tool rolls bodily round the mould, the axis of the tool should always meet the axis of the mould in the exact centre of the piece being shaped. It is also desirable that the axis round which the tool rolls shall be the same axis as that round which the mould rotates, that is, the axis 16 round which the mould rotates meets the axis of the tool 25 (round which the tool rotates if rotation is effected) in the centre of the mould; further the tool 25 will be carried by an arm or other element extending from a vertical member in exact alignment with the spindle 16, so that the bodily travelling movement of the tool will take place round the axis of this vertical member, and the braking mechanism, such as components 57, 58 would be applied to it. It will therefore be seen that there may be three separate rotary movements contributing to the shaping of the clay piece, (1) the rotation of the mould, (2) the rotation of the tool about its own axis, and (3) the bodily travelling movement of the tool round the axis of the mould. It is possible that it will be necessary in some cases to vary all three of these movements during the shaping operation, by stopping, retarding, accelerating or reversing any one or more of them. The exact requirements cannot be defined with certainty because they will vary in individual cases, according to the shape of the articles being made, and according to the nature of the clay body being used. Obviously an article having a pronounced contour, or a strongly defined foot, will require different treatment from a relatively flat and smooth article, just as clay bodies lacking in plasticity will be less easy to deal with than those possessing that characteristic more fully, if the best results are to be obtained.

Figure 2:
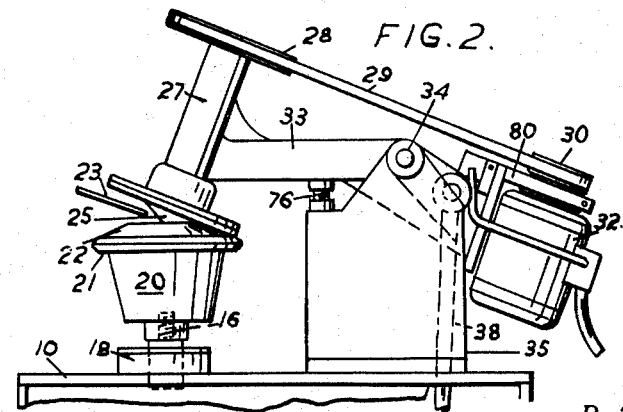
Figure 2 is a similar view to Figure 1 showing only the upper part of the machine to illustrate a modification.

It is not desired to limit the means of control to any particular form of device; in Figure 1 mechanically operated braking components 57, 58 are shown, but the same effect can be achieved electrically, magnetically or hydraulically. Figure 2 shows an electro-magnetic brake mechanism, which is of known type, and is indicated diagrammatically at 80. It is mounted with the motor 32 to act on the spindle 31 and pulley 30, and it comes into operation automatically when the switch cam 63 has switched off the motor 32. Conversely it becomes inoperative when the motor is switched on again. It will be obvious that this could equally well be applied to the vertical shaft 16 or to the vertical member in alignment with that shaft around which the roller 25 is to roll bodily, as has already been explained with reference to the mechanically operated braking components 57, 58.

We claim:

1. A method of finishing undried, unburnt clay-ware flat dinner articles comprising the steps of supporting a clay piece on a body having a face which conforms to one face of the finished ware, disposing a forming surface conforming substantially identically in diameters to the contiguous areas of the other face of the finished ware on the clay piece, rotating the clay piece and forming surface at the same speed to shape the clay, and thereafter creating a speed differential between the clay piece and the forming surface to finish smoothly the clay-ware article.

2. A machine for finishing undried, unburnt clay-ware flat dinner articles comprising a mold for supporting a clay piece having a surface which conforms to one face of the finished ware, a roller tool having a working face conforming substantially in diameters to the contiguous areas of the other face of the finished ware adapted to be disposed on the clay piece, power means to drive the mold and roller tool at the same speed to shape the article, and further means cooperating with the roller tool to retard the rotation of the roller tool to provide a smoothing action on the clay piece.

References Cited in the file of this patent

UNITED STATES PATENTS

| | | |
|---|---|---|
| 805,876 | O'Neill | Nov. 28, 1905 |
| 1,226,795 | Newby | May 22, 1917 |
| 1,268,984 | McCormick | June 11, 1918 |
| 1,423,009 | Muckenhirn | July 18, 1922 |
| 1,762,387 | Dengler | June 10, 1930 |
| 1,765,804 | Preston | June 24, 1930 |
| 1,826,577 | Schantz | Oct. 6, 1931 |